June 12, 1956 W. G. SCHINSKE 2,750,152
INSULATED FISH TAPE
Original Filed Dec. 9, 1950
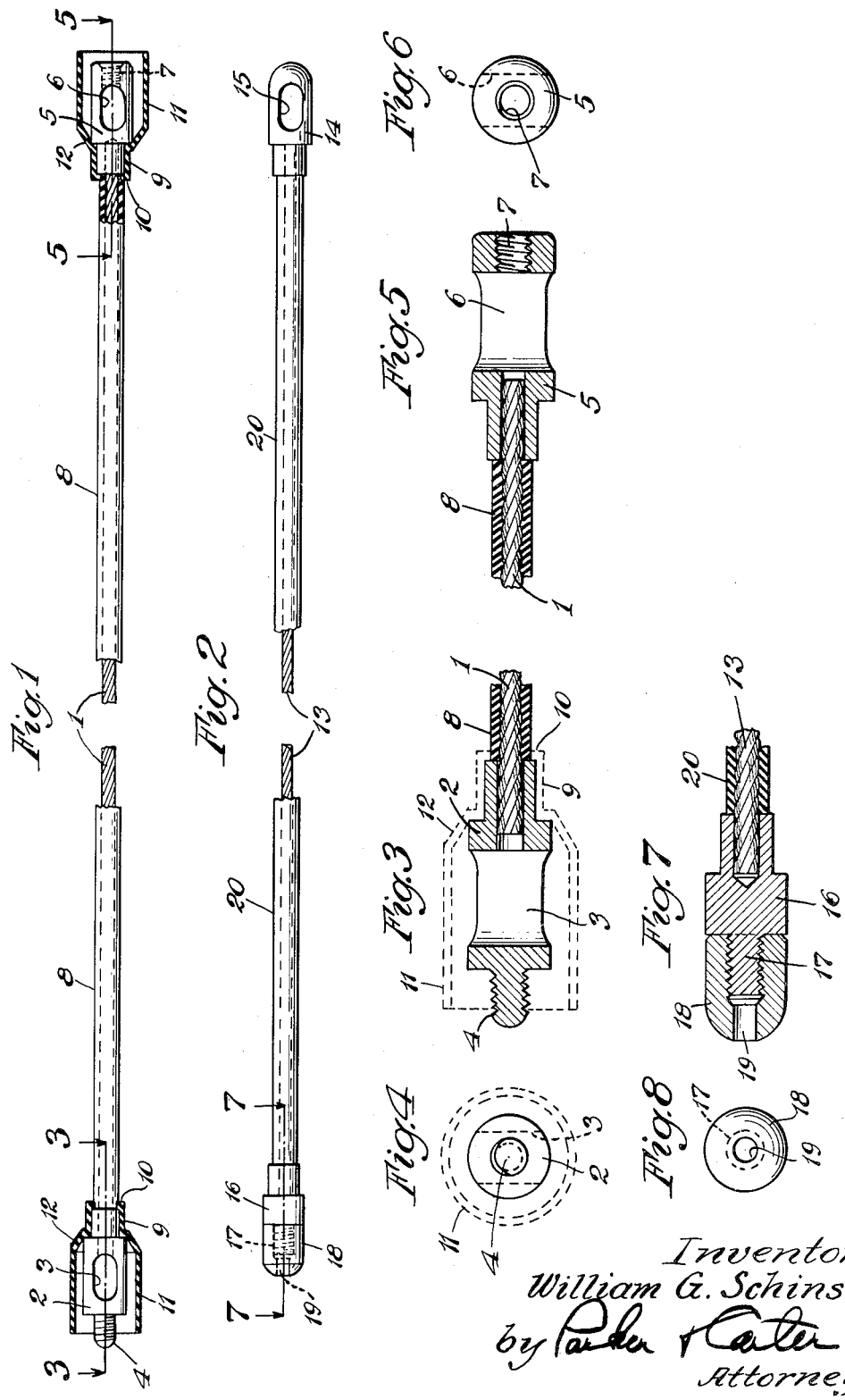
Inventor
William G. Schinske
by Parker & Carter
Attorneys

United States Patent Office 2,750,152
Patented June 12, 1956

2,750,152

INSULATED FISH TAPE

William G. Schinske, Sycamore, Ill., assignor to Ideal Industries, Inc., Sycamore, Ill., a corporation of Delaware Continuation of abandoned application Serial No. 200,006, filed December 9, 1950. This application July 27, 1953, Serial No. 370,359

3 Claims. (Cl. 254—134.3)

This is a continuation of application Serial No. 200,006, filed December 9, 1950, now abandoned.

This invention relates to a fish tape. The invention may be embodied in a fish tape which is, in effect, its own leader and may be of substantial length. One suitable length is twenty-five feet, but the fish tape might be shorter or longer. The invention may also be embodied in a leader which is relatively short and may be attached to a fish tape of the same general construction or to the standard or conventional fish tape.

One object of the invention is a fish tape construction in which the fish tape, although formed of material such as metal having substantial strength, is enclosed by a coating or cover.

Another object is a means and method involving a cover or coating for a fish tape or leader to accomplish electrical insulation and also to resist rusting and corrosion of the metal tape.

Another object is a means and method for reducing or preventing abrasion when the tape is used.

A still further object is a fish tape structure strong enough in one size to withstand a pull of more than one thousand pounds without breaking or rupturing and sufficiently flexible so that it will not have a pronounced tendency to unwind and get away from the operator.

Another object is a fish tape structure having the general properties shown and a method of making a fish tape with sufficient flexibility to pass around the bends in a conduit or pipe and with sufficient rigidity so that it will not buckle when being forced through the conduit.

A still further object is a fish tape structure of the type indicated and a method of making such a fish tape so as to increase the resistance to fatigue and breakage which occurs when the conventional tapes are used.

Other objects will appear from time to time throughout the specification and claims.

The invention is illustrated more or less diagrammatically in the accompanying drawings, wherein:

Figure 1 is a side elevation of a fish tape with parts in section;

Figure 2 is a side elevation with parts broken away illustrating an application of the basic tape member to a fish tape leader;

Figure 3 is a longitudinal section taken on an enlarged scale at line 3—3 of Figure 1;

Figure 4 is an end elevation of the member shown in Figure 3;

Figure 5 is a longitudinal section taken on an enlarged scale at line 5—5 of Figure 1;

Figure 6 is an end elevation of the structure shown in Figure 5;

Figure 7 is a longitudinal section taken on an enlarged scale at line 7—7 of Figure 2; and Figure 8 is an end view of the structure shown in Figure 7.

The fish tape illustrated in Figures 1 and 3 to 6, inclusive, includes a central or main member 1. This is preferably formed of a metal cable, such as a light, flexible steel cable. However, instead of being braided, it could be a solid wire, such as "piano" wire or the like. It could obviously be formed of other material, but it is relatively flexible and has substantial strength in tension to permit it to carry the necessary load when being used to draw wires through a conduit after the fish tape itself has been initially passed or threaded through the conduit. It must also have sufficient stiffness and rigidity so that it will not buckle when the fish tape is threaded through a conduit.

At each end the cable 1 is fastened to connecting members. As shown generally in Figure 1 and on an enlarged scale in Figure 3, a connecting member or fitting 2 is attached to the wire 1 by any desired means. This fitting 2 is provided with an opening 3. The opening, as shown in Figure 1, is in the form of an elongated slot, and the fitting 2 may carry a threaded projection 4 by means of which it may be attached to any desired member in order either to draw that member through the conduit or to be drawn itself by the attached member. The fitting 2 is normally made of metal and may be of steel for strength.

At the opposite end of the wire 1 a different type of fitting 5 is secured to the cable 1 in any desired manner so that they are tightly connected together. The fitting 5 is provided with a slot 6 and at its outer end may have a threaded cavity 7 by means of which it may be attached to another correspondingly threaded member.

The device thus far described comprises essentially a cable of substantial strength and a pair of fittings fastened one to each end of the cable. The fittings are of such construction that either or both of them may be used as a means for attaching the fish tape cable to some other member, such, for example, as a wire which is to be drawn through the conduit through which the fish tape has been threaded. All of the parts thus far described will normally be formed of metal; hence, they will normally be conductive of electricity.

One of the objects is a means for preventing short circuiting of electrical apparatus in connection with which the fish tape may be used, and I have provided an insulating sleeve means for the fish tape.

In addition to insulating the metal wire, it is also desirable to have a covering that reduces or completely eliminates corrosion. Such a covering must also prevent abrasion of the metal wire while at the same time giving sufficient stiffness and rigidity to prevent buckling of the cable when it is being threaded through a conduit. On the other hand, the covering must not make the wire or cable so stiff and rigid that it is difficut to manage and will whip or expand violently if it gets away from the operator or is laid down by him. In addition, the sleeve or coating must materially increase the resistance to fatigue because, to accommodate such a sleeve, the diameter of the wire must be reduced, and consequently the normal resistance to fatigue will be reduced. The coating material must be tough to the degree that it will not be cut or materially damaged when the tape is forced around the bends in conduits. Also, the sharp edges on the conduit bushings and boxes can cut soft material. There is also some pressure applied to the tape as it is forced around the corners of the conduit that will cause a soft material to flow and result in a partial, if not complete, failure of the sleeve.

I have found that a plastic sheath of the proper dimensions will accomplish all of the above, specifically the plastic that goes by the trade name Nylon. Also, a plastic with the trade name Teflon has proven satisfactory.

In Figure 1, an insulating and flexible sheath or tube 8 overlies the cable 1 generally and covers it completely from one fitting to the other.

The invention is not necessarily limited to nylon; however, it is mentioned as one available material having suitable physical properties. It cooperates with the cable to provide a composite fish tape structure having the strength, for example, of a steel cable, and having suitable but not excessive stiffness and at the same time the sheath or sleeve 8 protects the cable from rust and corrosion and abrasion and stiffens it sufficiently so that the composite fish tape may readily be forced through a conduit without buckling.

In the molding process the hot liquid plastic is rolled around the wire and is cooled by a water spray or the like. The cooling causes the plastic to contract and shrink tightly around the wire; consequently, when it reaches room temperature, a tight shrink fit exists between the wire and coating.

The sleeve 8 insulates that part of the cable 1 which is exposed but does not, of course, insulate the fittings 2 and 5 which are fixed to the ends of the cable. For that purpose, insulating jackets or hoods are provided to cover the metal fittings. As shown in Figure 1, and as suggested in dotted lines in Figures 3 and 4, these insulating hoods or jackets may be identical. They include a tubular portion 9 which embraces in either case the reduced portion of the fitting 2 or 5, respectively. The tubular portion 9 is provided with an end 10 which covers the end of the fitting and is in contact with the tubular sheath 8. The jackets or shields are enlarged as at 11 to provide a clearance about the fitting 2 or 5 so that wires or other members may be inserted through the slots 3 and 6, respectively. The enlarged portion 11 may be joined to the tubular portion 9 by a tapered section 12. The enlarged ends of the jackets are open to permit the entrance of wires, tapes or other members to which the fish tape is to be attached. In general, the insulating jackets serve the purpose of providing insulation about the metallic fittings 2 and 5 and, at the same time, provide sufficient clearance about the fittings so that they may be used for attachment to other articles when necessary without inconvenience and without the necessity for removing the insulating jacket. The precise shape and conformation of the jackets is a matter of choice and the invention is not limited to the exact shape shown. Generally, any shape of insulating jacket will be within the scope of the invention which covers the metal fitting parts with insulation and, at the same time, leaves sufficient space for attachment to the fish tape members when necessary in use.

The modified construction shown in Figures 2, 7 and 8 may be considered as a fish tape leader. It might be used with a fish tape made generally like that shown in Figure 1, or it might be used with a conventional insulated tape or wire. In general, it comprises a relatively short piece of cable 13, to one end of which is secured a fitting 14 slotted at 15. At the opposite end of the cable section 13 is a second fitting 16 which is provided with a threaded projecting portion 17 about which a correspondingly threaded cap 18 may be received. The cap 18 is provided with an opening or perforation 19 in its end through which a wire or other member may penetrate. The wire may be provided with a shape at its end by means of which it is retained within the cap 18 and thus connected to the fitting 16 and to the cable section 13. An insulating tube or sheath 20 is positioned about the cable 13 and, if desired, insulating jackets or hoods similar to those shown in Figure 1 may be supplied. Ordinarily, they will not be necessary and the metal fittings 14 and 16 will be exposed and not insulated. Where complete insulation is essential, the structure of Figure 1 will be used. Where it is not essential, the leader of Figure 2 may be used. The sleeve or tube 20 does, of course, insulate the cable 13 which it covers, and this, to some degree, eliminates the danger of short circuit when the device is used. There are advantages in using the insulating member 20 in connection with a leader, or even in conection with a full fish tape when the metal fittings at the ends are not insulated. For that reason, the device as shown in Figures 2, 7 and 8 has a very real value and is to be considered as a modified form of the device shown in Figure 1 and Figures 3 to 6, inclusive.

Although I have shown an operative form of my invention, it will be recognized that many changes in the form, shape and arrangement of parts may be made without departing from the spirit of the invention, and my showing is, therefore, to be taken as, in a sense, diagrammatic.

The use and operation of this invention are as follows:

The tape of the present invention, comprising a cable and a plastic tubular sheath, has less spring and tendency to uncoil violently than the standard fish tape of commerce, which is usually a flat steel wire. It is more flexible than the normal steel wire and has, however, sufficient resistance to bending so that it may be properly threaded through a conduit. The composite tape of the present invention thus has important structural advantages apart from those of insulation. It is physically a better fish tape than the standard flat steel wire fish tape. In general, the use and operation of this device in both of its forms is the same as that of the conventional fish tape and fish tape leader. Such fish tapes and fish tape leaders are available and their use is known. In use they are inserted and threaded through conduits, and some member, usually a wire, is fastened to the fish tape or the leader and it is then pulled through the conduit through which the fish tape or leader has been threaded. Customarily, the fish tape and the leader are provided with attachment means by which the members which are to be pulled through by the fish tape and the leader may be conveniently and firmly attached to the leader and the fish tape. Such attachment means are shown in the two forms of the invention illustrated herewith, and the devices illustrated are used to pull wires or other members through conduits. Obviously, several sections of the member shown in Figure 1 may be attached together, if necessary, to provide a member having a greater length than that possessed by any single part.

In general, the use of the form of Figure 1 is substantially that described above if, as suggested above, this fish tape is used in lengths up to twenty-five or thirty feet. It is obvious that in use the member may come in contact with adjacent articles. If, for example, the fish tape were used in the neighborhood of a switchboard or other electrical equipment, in use it might come in contact with uninsulated parts of the switchboard assembly. The purpose of the insulating tube is in part to make such contacts safe when and if they occur. Obviously, an operator using the device will attempt to keep it out of contact with adjacent articles and adjacent pieces of machinery, but such contact may be inevitable and will cause short circuits and other damage when the standard uninsulated fish tape is used. It is one of the objects of this invention to make such contact safe, should it occur, and to prevent damage as a result of such contact. The parts of the fish tape which are most completely under the control of a user or operator are the two ends. The ends, therefore, are less likely to strike adjacent articles or machinery and, if they are left uninsulated by the omission of the insulating jackets of Figure 1, the danger of undesired contact with adjacent machinery is not very great. For some purposes, therefore, the device of Figure 1 will be made and used without the insulating jackets covering the fittings, and the major advantage of insulating the major length of the total device will still be retained. The device may thus be used with or without the insulating jackets. Obviously, where total insulation and complete safety is desired the jackets will normally be present.

I claim:

1. For use as an insulated fish tape or the like, a metallic cable, metallic connecting members secured one at each end of the cable, said connecting members being provided with openings adapted to receive parts to be moved by said cable and being also provided with threaded parts whereby they can be connected to cooperating threaded connecting members, and electrically-insulating, flexible, tubular sheaths positioned about said cable and extending substantially from one end to the other thereof, and electrically insulating covering members positioned over said connecting members, spaced away from parts of said connecting members, and extending substantially from end to end thereof, said covering members slightly overlapping the tubular sheath at each end adjacent said connecting members.

2. In combination in a fish tape or the like, a flexible metallic sheath of a predetermined extent, a pair of fittings secured one at each end of said cable, each of said fittings having an opening disposed laterally through which a member may be thrust for fastening, each of said fittings being provided with a threaded member, one of said threaded members projecting from the fitting and the other of said threaded members formed within the fitting in a threaded bore-type structure, and an overall, electrically insulating sheathing for said fish tape, said sheathing comprising a flexible, unbroken, continuous, unitary, plastic, tubular member positioned about, in contact with, and extending substantially from end to end of said cable, a pair of insulating members positioned to extend over and to cover said fittings, said members being spaced outwardly away from said fittings and extending substantially from end to end thereof, said insulating members slightly overlapping the plastic tubular member at each end adjacent the fittings.

3. For use as an insulated fish tape or the like, a composite elongated tape structure including an elongated flexible metallic portion extending from one end of the tape structure to the other and having sufficient tensile strength to accommodate the tensions normally involved in fish tape work, and an elongated plastic sleeve portion coextensive with and surrounding the metal portion and concentric therewith, said elongated metal and plastic portions being in shrink-fitted engagement so that the metal portion is in lateral compression and the plastic portion is in lateral tension, the material of the plastic, the tensile strength of the metal portion, and the dimensions of both the plastic and metal portions being such that the composite tape structure will have sufficient rigidity to enable it to be forced through conventional conduits but with reduced flexibility as compared to a standard uncoated tape of equivalent strength so that it will not uncoil violently when released by the user.

References Cited in the file of this patent

UNITED STATES PATENTS

| 815,571 | Williams | Mar. 20, 1906 |
| 1,479,936 | Stevens | Jan. 8, 1924 |
| 2,142,290 | Slocum | Jan. 3, 1939 |
| 2,188,332 | Carothers | Jan. 30, 1940 |
| 2,262,861 | Rugeley et al. | Nov. 18, 1941 |
| 2,559,160 | Jacob | July 3, 1951 |
| 2,669,754 | Chadbourne | Feb. 23, 1954 |